Feb. 24, 1970 V. K. MUNN 3,497,629
REPERTOIRE DIALLING SYSTEM FOR TELEPHONE EXCHANGE
Filed July 31, 1967
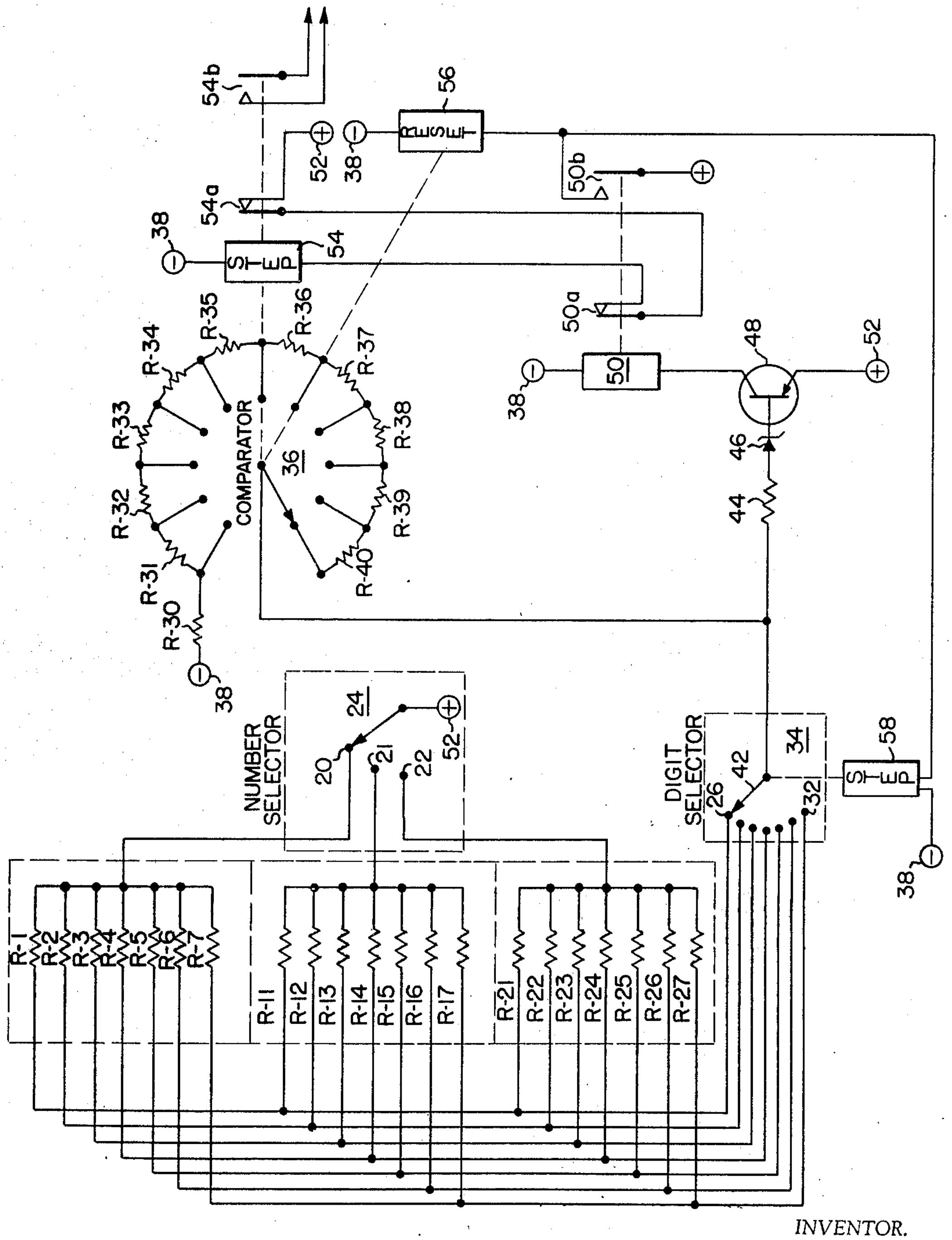
INVENTOR.
VAUGHN K. MUNN
BY [signature]
ATTY.

United States Patent Office 3,497,629

Patented Feb. 24, 1970

3,497,629

REPERTOIRE DIALLING SYSTEM FOR TELEPHONE EXCHANGE

Vaughn K. Munn, Rochester, N.Y., assignor to Stromberg-Carlson Corporation, Rochester, N.Y., a corporation of Delaware Filed July 31, 1967, Ser. No. 657,319
Int. Cl. H04m 3/42
U.S. Cl. 179—18 1 Claim

ABSTRACT OF THE DISCLOSURE

Each number in a subscriber's repertoire is stored at the central exchange as a group of resistors, each resistor representing one digit. When the exchange recognizes a repertoire call, it initiates a step-by-step comparison of each digit in sequence against successive steps in a voltage divider until a match is found. The stepping pulses constitute the generated output dial pulses, and are delivered to the central office switching equipment.

BRIEF SUMMARY OF THE INVENTION

This invention relates to a novel repertoire dialling system for use in a telephone exchange or the like, and, more particularly, to a novel system of this type wherein any one of a pre-selected group of seven digit or longer telephone numbers may be reached by dialling of a two-digit or three-digit code number.

Typically, in repertoire dialling systems, each participating subscriber is provided with ten two-digit code numbers, or up to one hundred three-digit code numbers, to which the subscriber may assign any regular telephone numbers such as those he frequently calls. The telephone operating company by suitable jumpering or storage arrangements modifies the central office equipment so that each time one of the code numbers is dialled, the switching equipment at the central office is automatically conditioned to extend the connection to the line identified by the full number assigned to the code number dialled.

In repertoire dialling systems as heretofore proposed generally for use with relatively large exchanges, a special storage matrix is provided in which a separate section is assigned to each participating subscriber with each section having, typically, ten separate compartments for storing respective ten digit numbers. The sections and compartments of the matrix are coded so that the dialling of any one of the code numbers causes a read-out of the number stored in the proper compartment of the section of the matrix assigned to the calling subscriber. This type of system requires a relatively large and complex storage matrix and associated operating equipment. Also, the storage matrix is a part of the central office equipment not readily subject to size variations, and once its capacity is fully utilized, it is not a simple matter to enlarge it.

The repertoire system of the present invention is intended primarily for use in relatively small exchanges such as, for example, those serving fewer than about three thousand subscribers, and of the step-by-step type. The system of the invention is arranged to require only a minimum of additional equipment at the central office, and to be readily expandable, unit by unit, on an individual subscriber basis if desired without requiring any special jumpering or other complex wiring arrangements at the central station.

Briefly, in accordance with the invention, the telephone numbers designated by each subscriber are stored at the central office in the form of a series of resistors of appropriately different values corresponding to the digits of the respective numbers. When a repertoire code is dialled, the central office switching equipment selects the desired group of resistors and scans them one by one to determine their values and to derive conventional dial pulses corresponding to their respective values. Three stepping switches are used in cooperative fashion, along with a balance detector. The first stepping switch is driven by the exchange switching equipment to select the desired group of resistors. The second switch connects the code resistors to the third stepping and to the detector. The third stepping switch scans the voltage divider until a balance is detected between the value of the particular code resistor to which it is connected and the resistance in the scanned portion of the voltage divider. The detector thereupon produces a signal to return the third stepping switch to its starting position and to step the second switch of the next resistor.

The stepping pulses produced by operation of the third stepping switch constitute conventional dial pulses which are fed to the central office switching equipment so that the central office switching equipment sees the operation of the third stepping switch as exactly similar to operation of the subscriber's dial as if the subscriber had dialled the full telephone number represented by the resistors in the repertoire circuit.

DETAILED DESCRIPTION

A presently preferred embodiment of the invention will now be described in connection with the accompanying drawing, wherein the single Figure is a schematic circuit diagram of a repertoire dialling system illustrating the principles of the present invention.

Referring now to the drawing, three repertoire numbers for a subscriber are indicated as stored in respective groups of resistors R–1—R–7, R–11—R–17, and R–21—R–27, respectively. In each group, the resistors are connected in common to a respective fixed contact 20, 21, or 22 of a stepping switch 24 denoted the number selector. The opposite terminals of the resistors are connected to respective terminals 26–32 of another stepping switch 34 called the digit selector. Corresponding resistors in each of the groups are connected in common to the same terminals 26–32 of the digit selector switch 34, that is, the first resistor in each group is connected to the first terminal 26, the second resistor to the second terminal, and so on.

The circuit also includes a third stepping switch 36 called the comparator switch, which has eleven fixed contacts (not separately designated) connected to respective separate terminals of a voltage divider network comprising eleven resistors R–30—R–40. The first resistor R–30 is connected between the first fixed contact of the comparator switch 36 and the negative battery terminal 38 of the exchange. The movable contact 40 of the comparator switch is connected to the movable contact 42 of the digit selector switch, and through a limiting resistor 44 and a Zener diode 46 to the base of a transistor 48. The rest of the circuit connections will be apparent from the following description of the operation of the circuit in response to an assumed repertoire call placed by the subscriber.

The collector of the transistor 48 is connected through the winding of a release relay 50 to the negative battery terminal 38. Its emitter is connected directly to the positive battery terminal 52. In operation, normally the transistor 48 is held energized by bias applied from the negative battery terminal 38 through the voltage divider, the limiting resistor 44, and the Zener diode 46 to the base of the transistor. So long as the transistor 48 is held in its ON condition, it holds open the first contact 50*a* of the relay 50 thereby opening the circuit of the stepping winding 54 of the comparator switch 36 and disabling the comparator switch. The second contact 50*b* of the release relay 50 is held closed to complete the circuit for the winding 56 of the comparator switch 36 so that the comparator switch is held in its reset position. The number selector switch 24 normally sits on a idle contact (not shown) so that all of the repertoire resistors R–1—R–27 are open circuited.

The number selector switch 24 is driven by operation of the exchange switching equipment, which need not be described herein, responsively to the dialling of a two-digit or three-digit number by the subscriber to one or another of its fixed contacts 20–22 to select a particular group of the repertoire resistors designating the assigned number desired by the subscriber. At the start, the movable contact 42 of the digit selector switch is at the first fixed contact 26. As soon as the number selector switch 24 lands at its designated contact, say, for example, the first contact 20, all of the resistors in the corresponding repertoire group are connected to the positive battery terminal 52. The first resistor R–1 is thus placed in series between the battery terminals 38 and 52 with the voltage divider R–30—R–40 through the comparator switch 36, the digit selector switch 34, and the number selector switch 20.

The values of the resistors in the voltage divider R–30—R–40, and the values of the repertoire resistors R–1—R–27 are chosen such that in every instance when the connection is first effected, the voltage across the Zener diode 46 is less than the breakdown voltage of the diode. At this time, therefore, the transistor 48 becomes cut-off; and the release relay 50 is de-energized, and its contact 50*a* is closed to energize the stepping winding 54 of the comparator switch 36. The comparator switch 36 ithen steps to its second position, thereby decreasing the resistance of the voltage divider network in the series circuit and driving the anode of the Zener diode 46 more negative. The comparator switch 36 continues to step, through the action of its first stepping contact 54*a*, until the voltage across the Zener diode 46 exceeds the diode's breakdown voltage. When this occurs, the transistor 48 is again turned ON to energize the release relay 50, whereupon by operation of the contacts 50*b* of the release relay, the reset winding of the comparator switch is energized to reset the comparator switch, and the stepping winding 58 of the digit selector switch 34 is energized to step the digit selector switch. This sequence of action is repeated for each of the seven resistors in the selected group of repertoire resistors.

A second contact 54*b* is driven by the stepping winding 54 of the comparator switch to produce output pulses for delivery to the normal dial pulse receiving equipment in the exchange.

The values of the repertoire resistors R–1—R–27, and the values of the resistors R–30—R–40 of the voltage divider are chosen so that different respective values of the repertoire resistors will cause the voltage across the Zener diode 46 to change from a value less than to a value greater than the breakdown voltage of the diode at different respective steps of the comparator switch 36 in accordance with the value of the particular digit represented by the individual repertoire resistor.

A wide range of different specific values may be chosen, all in accordance with straightforward application of Ohm's law to achieve this result. In one specific instance in which satisfactory operation has been achieved, using a 10 volt Zener diode 46, resistors of the following values were found to be effective. In the voltage divider:

| | Ohms |
|---|---|
| R–**30** | 1.0K |
| R–**31** | 1.2K |
| R–**32** | 1.8K |
| R–**33** | 2.4K |
| R–**34** | 3.3K |
| R–**35** | 4.3K |
| R–**36** | 5.6K |
| R–**37** | 7.5K |
| R–**38** | 10K |
| R–**39** | 13K |
| R–**40** | 18K |

The repertoire resistors R–1—R–27 were as follows:

| Digit: | Res. ohms |
|---|---|
| **1** | 17K |
| **2** | 11.5K |
| **3** | 8.5K |
| **4** | 6.2K |
| **5** | 4.5K |
| **6** | 3.2K |
| **7** | 2.2K |
| **8** | 1.5K |
| **9** | 0.93K |
| **0** | 0.50K |

What is claimed is:

1. A repertoire dialling system for use in a telephone exchange or the like, including means for storing information designating digits of a telephone number and for producing a series of output pulses responsively to the stored information comprising:

(a) a group of resistors, (b) a voltage divider network, (c) switching means for connecting said resistors one at a time in predetermined sequence in series with said voltage divider network, (d) a stepping arrangement for decreasing the value of said voltage divider network connected in series with said resistors in step-wise fashion by predetermined successive increments, and (e) a detector for producing an output signal responsively to a predetermined change in the resistance ratio between said resistors and the value of said voltage divider network connected in series therewith.

References Cited

UNITED STATES PATENTS 3,194,890 7/1965 Haskins ............ 179—18

KATHLEEN H. CLAFFY, Primary Examiner

TOM D'AMICO, Assistant Examiner